(12) United States Patent
Liu

(10) Patent No.: US 11,947,230 B2
(45) Date of Patent: Apr. 2, 2024

(54) ARRAY SUBSTRATE, LIQUID CRYSTAL DISPLAY PANEL, AND DISPLAY DEVICE

(71) Applicant: SUZHOU CHINA STAR OPTOELECTRONICS TECHNOLOGY CO., LTD., Jiangsu (CN)

(72) Inventor: Yingying Liu, Suzhou (CN)

(73) Assignee: SUZHOU CHINA STAR OPTOELECTRONICS TECHNOLOGY CO., LTD., Jiangsu (CN)

(*) Notice: Subject to any disclaimer, the term of this patent is extended or adjusted under 35 U.S.C. 154(b) by 73 days.

(21) Appl. No.: 17/770,357

(22) PCT Filed: Apr. 12, 2022

(86) PCT No.: PCT/CN2022/086293
§ 371 (c)(1),
(2) Date: Apr. 20, 2022

(87) PCT Pub. No.: WO2023/184567
PCT Pub. Date: Oct. 5, 2023

(65) Prior Publication Data
US 2023/0314886 A1  Oct. 5, 2023

(30) Foreign Application Priority Data
Mar. 30, 2022 (CN) .......................... 202210330834.3

(51) Int. Cl.
*G02F 1/1362* (2006.01)
*G02F 1/1343* (2006.01)

(52) U.S. Cl.
CPC .. *G02F 1/136286* (2013.01); *G02F 1/134345* (2021.01)

(58) Field of Classification Search
CPC ........................................................ G09G 3/36
See application file for complete search history.

(56) References Cited

U.S. PATENT DOCUMENTS

| 2018/0039114 A1* | 2/2018 | Xu ................. G09G 3/3648 |
| 2018/0053478 A1 | 2/2018 | Xu |

(Continued)

FOREIGN PATENT DOCUMENTS

| CN | 101566744 A | 10/2009 |
| CN | 104062820 A | 9/2014 |

(Continued)

OTHER PUBLICATIONS

International Search Report in International application No. PCT/CN2022/086293, dated Nov. 29, 2022.

(Continued)

*Primary Examiner* — Sang V Nguyen
(74) *Attorney, Agent, or Firm* — Rivka Friedman

(57) ABSTRACT

The present application discloses an array substrate, a liquid crystal display panel, and a display device. Each pixel unit includes a first sub-pixel electrode and a second sub-pixel electrode electrically connected to a same data line. In each row of pixel units, the first sub-pixel electrode and the second sub-pixel electrode are arranged alternately. The first sub-pixel electrode is connected with a scanning line at an upper level and adjacent to a row where the pixel unit is located, and the second sub-pixel electrode is connected with a scanning line at a lower level and adjacent to a row where the pixel unit is located.

12 Claims, 6 Drawing Sheets

(56) References Cited

U.S. PATENT DOCUMENTS

| | | | |
|---|---|---|---|
| 2018/0108307 A1* | 4/2018 | Sakurai | G09G 3/3648 |
| 2018/0190216 A1* | 7/2018 | Wang | G02F 1/136286 |
| 2020/0090612 A1 | 3/2020 | Wang | |
| 2022/0044649 A1* | 2/2022 | Koide | G02F 1/13454 |
| 2022/0189427 A1* | 6/2022 | Zhao | G09G 3/3677 |

FOREIGN PATENT DOCUMENTS

| | | | |
|---|---|---|---|
| CN | 104280962 A | 1/2015 | |
| CN | 104808406 A | 7/2015 | |
| CN | 105182638 A | 12/2015 | |
| CN | 105446034 A | 3/2016 | |
| CN | 105511184 A | 4/2016 | |
| CN | 105867040 A | 8/2016 | |
| CN | 106652951 A | 5/2017 | |
| CN | 106991953 A | 7/2017 | |
| CN | 110308599 A | 10/2019 | |
| CN | 110456585 A | 11/2019 | |
| CN | 210298135 U | 4/2020 | |
| CN | 111258139 A | 6/2020 | |
| CN | 112086077 A | 12/2020 | |
| CN | 112540487 A | 3/2021 | |
| CN | 113376912 A | 9/2021 | |
| CN | 113608386 A | 11/2021 | |
| CN | 114170986 * | 3/2022 | G09G 3/36 |
| CN | 114170986 A | 3/2022 | |

OTHER PUBLICATIONS

Written Opinion of the International Search Authority in International application No. PCT/CN2022/086293, dated Nov. 29, 2022.
Chinese Office Action issued in corresponding Chinese Patent Application No. 202210330834.3 dated Jun. 29, 2023, pp. 1-9.

* cited by examiner

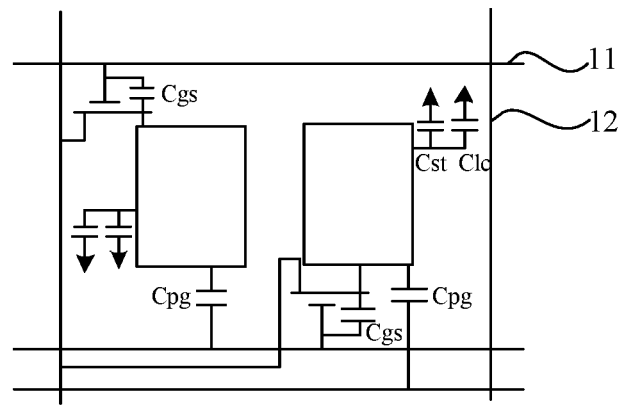
FIG. 3
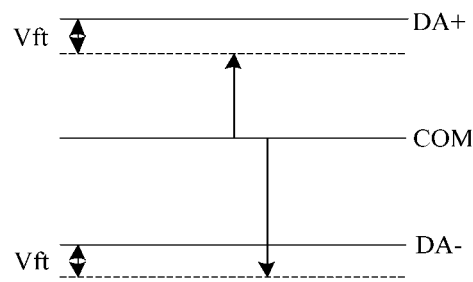
FIG. 4
|  | G | G | G | G |
|---|---|---|---|---|
| firth row | 3 | 4 | 2 | 1 |
| second row | 1 | 2 | 4 | 3 |
| third row | 3 | 2 | 2 | 1 |
| fourth row | 1 | 4 | 4 | 3 |
| total brightness | 8 | 12 | 12 | 8 |
FIG. 5

| | G | G | G | G |
|---|---|---|---|---|
| first row | 2 | 2 | 3 | 3 |
| second row | 3 | 3 | 2 | 2 |
| third row | 2 | 2 | 3 | 3 |
| fouth row | 3 | 3 | 2 | 2 |
| total brightness | 10 | 10 | 10 | 10 |

|  | G | G | G | G |
|---|---|---|---|---|
| first row | 1 | 4 | 4 | 1 |
| second row | 4 | 1 | 1 | 4 |
| third row | 1 | 4 | 4 | 1 |
| fouth row | 4 | 1 | 1 | 4 |
| total brightness | 10 | 10 | 10 | 10 |

ARRAY SUBSTRATE, LIQUID CRYSTAL DISPLAY PANEL, AND DISPLAY DEVICE

FIELD OF INVENTION

The present application relates to a field of display, in particular, to an array substrate, a liquid crystal display panel, and a display device.

DESCRIPTION OF PRIOR ART

With progress of science and technology, liquid crystal display panels have been widely used in various fields, especially in a variety of electronic products because of advantages such as lightweight, low power consumption, no-radiation, etc. With an improvement of resolution, a number of data lines of a liquid crystal display panel will increase in proportion, and then a number of source driver chips providing data signals will increase exponentially, resulting in an increase in production costs. In this regard, a driving mode of DLS (Data Line Sharing) is often used to reduce the number of the data lines.

Technical Problem

When observing the liquid crystal display panel with DLS architecture under static conditions, due to a continuous switching of positive and negative frames, a brightness of a pixel display also changes continuously. The brightness is superimposed on a human eye, and the human eye cannot distinguish any brightness difference. However, when the liquid crystal display panel displays a dynamic picture or when people shake their head while watching the screen, light, light or dark, and dark are superimposed, the human eye will capture a stripe or grid display screen, that is, a so-called phenomenon of head shaking stripes.

SUMMARY

The present application provides an array substrate, a liquid crystal display panel, and a display device, to solve a technical problem of the head shaking stripes in a display screen of an array substrate with DLS architecture.

The present application provides an array substrate, comprising:
a plurality of scanning lines, the plurality of the scanning lines arranged along a first direction;
a plurality of data lines, the plurality of the data lines arranged along a second direction, wherein the second direction and the first direction intersect;
a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;
wherein, one of the data lines is arranged between two adjacent columns of the pixel units, and two of the scanning lines are arranged between two adjacent rows of the pixel units; in each row of the pixel units, first sub-pixel electrodes and second sub-pixel electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located.

In the embodiments of the application, connection types of the first sub-pixel electrode and the second sub-pixel electrode is reduced, so as to reduce a brightness difference between each sub-pixel and improve a problem of the head shaking stripes.

Alternatively, in some embodiments of the present application, along the first direction, the first sub-pixel electrodes located in the two adjacent rows of the pixel units are staggered, and in a same column of the pixel units, adjacent two of the pixel units are respectively connected to adjacent two of the data lines.

In the embodiments of the present application, by changing polarities of data voltages transmitted by the adjacent data lines, the polarities of the first sub-pixel electrode and the second sub-pixel electrode can be controlled, so as to realize a function of more voltage inversion in the first direction.

Alternatively, in some embodiments of the present application, in a same one of the pixel units, the first sub-pixel electrode is closer to a corresponding one of the data lines connecting the first sub-pixel electrode and the second sub-pixel electrode at a same time.

In the embodiments of the present application, the array substrate only comprises two pixel connection types: B-type and C-type. Moreover, a gate source capacitance Cgs of the C-type is small, and a coupling capacitance Cpg of the B-type is small, which has less impact on the first sub-pixel electrode and the second sub-pixel electrode, so as to further reduce the brightness difference between sub-pixels and improve the problem of head shaking stripes.

Alternatively, in some embodiments of the present application, in a same one of the pixel units, the second sub-pixel electrode is closer to a corresponding one of the data lines connecting the first sub-pixel electrode and the second sub-pixel electrode at a same time.

In the embodiments of the present application, the array substrate only comprises two pixel connection types: A-type and D-type, which can reduce the brightness difference between sub-pixels and improve the problem of head shaking stripes.

Alternatively, in some embodiments of the present application, in a same frame display screen, adjacent two of the data lines are configured to transmit data voltages with opposite polarities.

In the embodiments of the present application, the array substrate adopts a driving mode of two-point inversion, which can further improve a quality of the display screen.

Alternatively, in some embodiments of the present application, in a same frame display screen, each of the data lines is configured to transmit a data voltage with a same polarity, and in two adjacent frame display screens, a same one of the data lines is configured to transmit data voltages with opposite polarity.

In the embodiments of the present application, the array substrate adopts a driving mode of frame inversion, which not only improves the quality of the display screen, but also reduces a change complexity of the data voltages and reduces a power consumption of a driving chip providing the data voltages.

Alternatively, in some embodiments of the present application, the first sub-pixel electrodes located in two adjacent rows of the pixel units are arranged in a one-to-one correspondence, and the pixel units located in a same column are electrically connected with a same one of the data lines;

wherein, in each of the pixel units, the first sub-pixel electrode is located in a second column, the second sub-pixel electrode is located in a first column, or the first sub-pixel electrode is located in the first column, and the second sub-pixel electrode is located in the second column.

In the embodiments of the present application, the array substrate only comprises two pixel connection types, and since positions of the first sub-pixel electrode and the second sub-pixel electrode are the same in each of the pixel units, connections of the first sub-pixel electrode and the second sub-pixel electrode with the scanning lines and the data lines are more regular, which simplifies a manufacturing process.

Alternatively, in some embodiments of the present application, along the first direction, polarities of data voltages received by adjacent two of the pixel units connecting to a same one of the data lines are opposite.

In the embodiments of the present application, while simplifying the manufacturing process, the two-point inversion can be realized through a change of polarities of the data voltages to further improve the display screen.

The present application further provides a liquid crystal display panel, comprising an array substrate and a color film substrate arranged corresponding to each other, wherein the array substrate comprises:
- a plurality of scanning lines, the plurality of the scanning lines arranged along a first direction;
- a plurality of data lines, the plurality of the data lines arranged along a second direction, wherein the second direction and the first direction intersect;
- a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;

wherein, one of the data lines is arranged between two adjacent columns of the pixel units, and two of the scanning lines are arranged between two adjacent rows of the pixel units; in each row of the pixel units, first sub-pixel electrodes and second sub-pixel electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located.

Alternatively, in some embodiments of the present application, the color film substrate comprises a plurality of color resists, and the plurality of the color resists comprise red color resists, green color resists, and blue color resists;

wherein, each of the color resists is arranged corresponding to the first sub-pixel electrode or the second sub-pixel electrode, the red color resists, the green color resists, and the blue color resists arranged corresponding to one row of the pixel units are repeatedly arranged in any arrangement combination, and colors of the color resists corresponding to the first sub-pixel electrode or the second sub-pixel electrode in a same column are same.

Alternatively, in some embodiments of the present application, along the first direction, the first sub-pixel electrodes located in the two adjacent rows of the pixel units are staggered, and in a same column of the pixel units, adjacent two of the pixel units are respectively connected to adjacent two of the data lines.

Alternatively, in some embodiments of the present application, in a same one of the pixel units, the first sub-pixel electrode is closer to a corresponding one of the data lines connecting the first sub-pixel electrode and the second sub-pixel electrode at a same time.

Alternatively, in some embodiments of the present application, in a same one of the pixel units, the second sub-pixel electrode is closer to a corresponding one of the data lines connecting the first sub-pixel electrode and the second sub-pixel electrode at a same time.

Alternatively, in some embodiments of the present application, the first sub-pixel electrodes located in two adjacent rows of the pixel units are arranged in a one-to-one correspondence, and the pixel units located in a same column are electrically connected with a same one of the data lines;

wherein, in each of the pixel units, the first sub-pixel electrode is located in a second column, the second sub-pixel electrode is located in a first column, or the first sub-pixel electrode is located in the first column, and the second sub-pixel electrode is located in the second column.

The present application further provides a display device, wherein the display device comprises a liquid crystal display panel, a source driving chip, and a gate driving circuit, the source driving chip is configured to provide data voltages to the liquid crystal display panel, the gate driving circuit is configured to provide scanning signals to the liquid crystal display panel, the liquid crystal display panel comprises an array substrate, and the array substrate comprises:
- a plurality of scanning lines, the plurality of the scanning lines arranged along a first direction;
- a plurality of data lines, the plurality of the data lines arranged along a second direction, wherein the second direction and the first direction intersect;
- a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;
- wherein, one of the data lines is arranged between two adjacent columns of the pixel units, and two of the scanning lines are arranged between two adjacent rows of the pixel units; in each row of the pixel units, first sub-pixel electrodes and second sub-pixel electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located.

Alternatively, in some embodiments of the present application, the liquid crystal display panel comprises an array substrate and a color film substrate arranged corresponding to each other;

wherein, the color film substrate comprises a plurality of color resists, and the plurality of color resists comprises red color resists, green color resists, and blue color resists;

wherein, each of the color resists is arranged corresponding to the first sub-pixel electrode or the second sub-pixel electrode, the red color resists, the green color resists, and the blue color resists arranged corresponding to one row of the pixel units are repeatedly arranged in any arrangement combination, and colors of the color resists corresponding to the first sub-pixel electrode or the second sub-pixel electrode in a same column are same.

Alternatively, in some embodiments of the present application, along the first direction, the first sub-pixel electrodes located in the two adjacent rows of the pixel units are staggered, and in a same column of the pixel units, adjacent two of the pixel units are respectively connected to adjacent two of the data lines.

Alternatively, in some embodiments of the present application, in a same one of the pixel units, the first sub-pixel electrode is closer to a corresponding one of the data lines connecting the first sub-pixel electrode and the second sub-pixel electrode at a same time.

Alternatively, in some embodiments of the present application, in a same one of the pixel units, the second sub-pixel electrode is closer to a corresponding one of the data lines connecting the first sub-pixel electrode and the second sub-pixel electrode at a same time.

Alternatively, in some embodiments of the present application, the first sub-pixel electrodes located in two adjacent rows of the pixel units are arranged in a one-to-one correspondence, and the pixel units located in a same column are electrically connected with a same one of the data lines;

wherein, in each of the pixel units, the first sub-pixel electrode is located in a second column, the second sub-pixel electrode is located in a first column, or the first sub-pixel electrode is located in the first column, and the second sub-pixel electrode is located in the second column.

The present application provides an array substrate, a liquid crystal display panel, and a display device. The array substrate comprises a plurality of scanning lines, a plurality of data lines, and a plurality of pixel units. Each of the pixel units comprises a first sub-pixel electrode and a second sub-pixel electrode, which are electrically connected to a same one of the data lines. Among them, one of the data lines is arranged between two adjacent columns of the pixel units, and two of the scanning lines are arranged between two adjacent rows of the pixel units. In each row of the pixel units, first sub-pixel electrodes and second sub-pixel electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located. Through the above settings, the present application can reduce the connection types of sub-pixels on the array substrate, reduce the interference difference between sub-pixels, and then reduce the brightness difference between sub-pixels, so as to improve the problem of the head shaking stripes.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

FIG. 3 is a structural schematic diagram of a circuit structure at A in FIG. 1 provided by the present application.

FIG. 4 is a schematic diagram of a brightness distribution of green sub-pixels of adjacent columns in FIG. 1 provided by the present application.

FIG. 5 is a schematic diagram of a relationship between data voltages and feedthrough voltages provided by the present application.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it should be understood that the specific embodiments described herein are only used to illustrate and explain the present application and are not used to limit the present application.

In the description of this present application, it should be understood that the terms "first" and "second" are only used for descriptive purposes and cannot be understood as indicating or implying relative importance or implicitly indicating the number of indicated technical features. Thus, the features defining "first" and "second" may explicitly or implicitly comprise one or more of the features. Therefore, it cannot be understood as a limitation of the present application.

The present application provides an array substrate, a liquid crystal display panel, and a display device described in detail below. It should be noted that the order of description of the following embodiments does not limit the preferred order of the embodiments of the present application.

Figure 1:
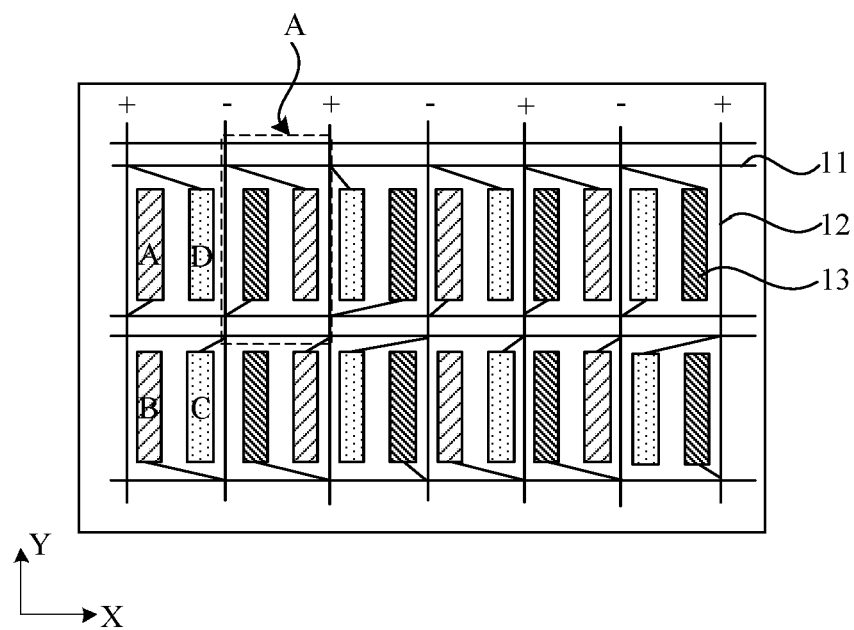
FIG. 1 is a structural schematic diagram of an array substrate in a prior art provided by the present application.
Figure 2:
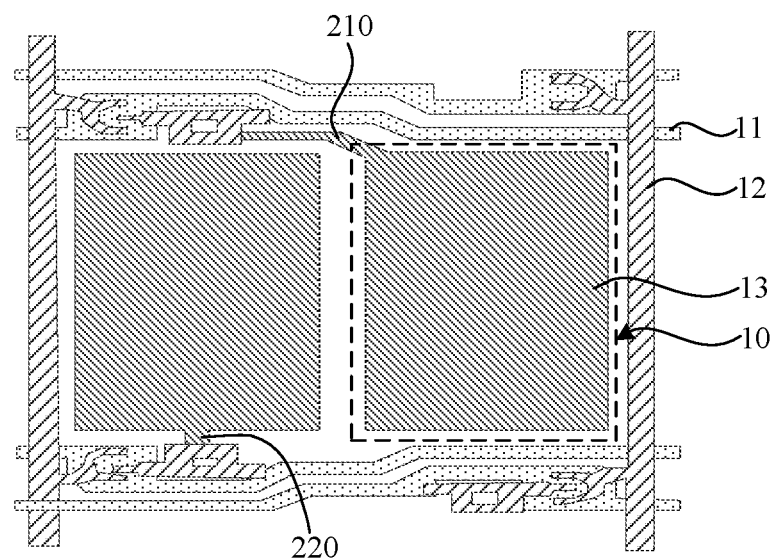
FIG. 2 is an enlarged structural schematic diagram at A in FIG. 1 provided by the present application.

Specifically, please refer to FIGS. 1-3. FIG. 1 is a structural diagram of an array substrate in a prior art provided by the present application. FIG. 2 is an enlarged structural diagram at A in FIG. 1 provided by the present application. FIG. 3 is a schematic diagram of a circuit structure at A in FIG. 1 provided by the present application.

Generally, each sub-pixel 10 is electrically connected with a corresponding scanning line 11 and a corresponding data line 12 through a transistor (not identified in the figures). Each sub-pixel 10 comprises a pixel electrode 13. A gate of the transistor is electrically connected to the scanning line 11. A source of the transistor is electrically connected to the data line 12. The pixel electrode is electrically connected to a drain of the transistor 13.

First, for two adjacent sub pixels 10 connected with a same data line 12, because a distance between the two sub pixels 10 and the same data line 12 is different, a length of connecting lines between the pixel electrode 13 of the two sub pixels 10 and the transistor is also different. For example, a length of a first connecting line 210 in FIG. 2 is greater than that of a second connecting line 220. The following embodiments of the present application refer to different lengths of the connecting lines as long axis connection and short axis connection, respectively. A gate source capacitance Cgs of the sub-pixel 10 with long axis connection is larger, and the gate source capacitance Cgs of the sub-pixel 10 with short axis connection is smaller.

Secondly, since the scanning lines 11 are opened line by line, a first row of the scanning lines 11 located above the sub-pixel 10 will open the sub-pixel 10 connected to it first. Then, a second row of the scanning lines 11 located below the sub-pixel 10 opens the sub-pixel 10 connected thereto. At this time, the second row of the scanning lines 11 has a large coupling capacitance Cpg for the pixel electrode 13 of the sub-pixel 10 opened by the first line of the scanning lines 11, while a third row of the scanning lines 11 has a small coupling capacitance Cpg for the pixel electrode 13 opened by the second row of the scanning lines 11 due to its long distance, which can be ignored.

Therefore, a formula of a feedthrough voltage caused by the gate source capacitance Cgs and the coupling capacitance Cpg is:

$$Vft=(Cgs+Cpg)/Ctotal$$

It can be seen that a size difference between the gate source capacitance Cgs and the coupling capacitance Cpg will cause a size difference of the feedthrough voltage Vft of different sub pixels 10. Wherein Ctotal is a relevant capacitance of all pixels, and a commonly seen formula is Ctotal=Cgs+Cst+Clc. Where Cst is a storage capacitor and Clc is a liquid crystal capacitor.

Please also refer to FIGS. 1-4, FIG. 4 is a schematic diagram of a brightness distribution of green sub-pixels of adjacent columns in FIG. 1 provided by the present application. Wherein, a solid line in the figure represents an ideal voltage of the sub-pixel 10. A dotted line represents an actual voltage of the sub-pixel 10. A positive data voltage $Da^+$ and a negative data voltage $D^-$ of a same gray scale are symmetrical about a common voltage COM. It can be seen that a difference of the feedthrough voltage Vft corresponds to a display brightness difference of the sub-pixel 10. Wherein, for positive pixels, the larger the feedthrough voltage Vft, the smaller the actual voltage, and the darker the pixel. For negative pixels, the larger the feedthrough voltage Vft, the larger the actual voltage, and the brighter the pixel.

Therefore, it can be seen from FIG. 1 that a connection mode of the sub-pixel 10 on the existing array substrate can be divided into four types by the Feedvoltage Vft. The first type: A-type connected from the lower (connected to the scanning line 11 located below the sub-pixel 10) short axis (the gate source capacitance Cgs is small, the coupling capacitance Cpg is ignored, and the Feedvoltage Vft is the smallest). The second type: B-type connected from the lower long axis (the gate source capacitance Cgs is large, the coupling capacitance Cpg is ignored, and the Feedvoltage Vft is small). The third type: C-type connected from the upper (connected to the scanning line 11 above the sub-pixel 10) short axis (smaller gate source capacitance Cgs, larger coupling electric Cpg and larger Feedvoltage Vft). The fourth type: D-type connected from the upper long axis (the gate source capacitance Cgs is large, the coupling electric Cpg is large, and the Feedvoltage Vft is the largest).

Further, please refer to FIGS. 1-5, FIG. 5 is a schematic diagram of a relationship between data voltages and Feedthrough voltages provided by the present application. In existing array substrates, each row of the sub pixels 10 is repeatedly arranged with RGB as a repeating unit, and the adjacent two data lines 12 are configured to transmit data voltages with opposite polarities. Since human eyes are more sensitive to green in an RGB three-color sub-pixels, the present application takes a brightness distribution of green sub-pixels as an example.

Specifically, according to the above four pixel connection types and the positive and negative polarities of the sub-pixel 10, it is found that a total brightness of green sub-pixels in adjacent columns switches between 8 and 12, and there is a column brightness difference itself, which eventually leads to a formation of a phenomenon of head shaking stripes.

Figures 6, 7:
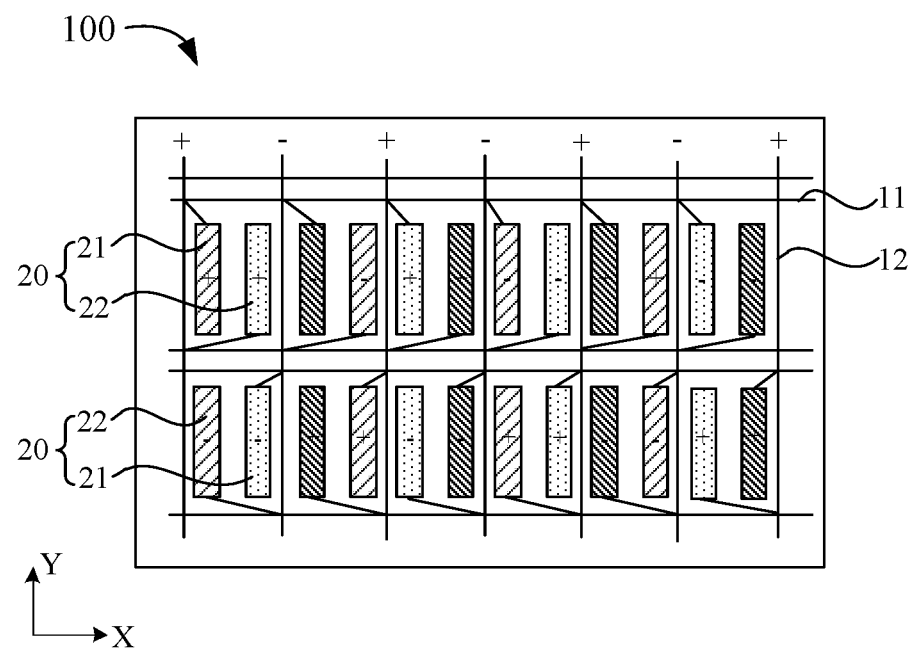
FIG. 6 is a first structural schematic diagram of an array substrate provided by the present application.
FIG. 7 is a schematic diagram of a brightness distribution of green sub-pixels of adjacent columns in FIG. 6 provided by the present application.

Please refer to FIG. 6, FIG. 6 is a first structural diagram of an array substrate provided by the present application. In the embodiments of the present application, an array substrate 100 comprises a plurality of scanning lines 11, a plurality of data lines 12, and a plurality of pixel units 20.

Specifically, each of the scanning lines 11 extends along a second direction X. The plurality of the scanning lines 11 are arranged along a first direction Y. Each of the data lines 12 extends along the first direction Y. The plurality of the data lines 12 are arranged along the second direction X. The plurality of the pixel units 20 are arranged in an array. Each of the pixel units 20 comprises a first sub-pixel electrode 21 and a second sub-pixel electrode 22. The first sub-pixel electrode 21 and the second sub-pixel electrode 22 are electrically connected to a same data lines 12.

Wherein, one of the data lines 12 is arranged between two adjacent columns of the pixel units 20. Two of the scanning lines 11 are arranged between two adjacent rows of the pixel units 20. In each row of the pixel units 20, first sub-pixel electrodes 21 and the second sub-pixel electrodes 22 are arranged alternately. Each of the first sub-pixel electrode 21 is electrically connected to an adjacent one of the scanning lines 11 at an upper level of a row where the pixel unit 20 is located. Each of the second sub-pixel electrode 22 is electrically connected to an adjacent one of the scanning lines 11 at a lower level of a row where the pixel unit 20 is located.

When the array substrate 100 is in a vertical plane, the upper level is above. The first direction Y and the second direction X can cross perpendicularly or only cross but not perpendicularly. The attached drawings are only examples and cannot be understood as limiting the present application.

Materials of the scanning lines 11 and the data lines 12 can be any one of silver (Ag), aluminum (Al), nickel (Ni), chromium (Cr), molybdenum (Mo), copper (Cu), tungsten (W), or titanium (Ti). The above metals have good conductivity and low cost, ensuring conductivity of the scanning lines 11 and the data lines 12 while production cost can be reduced. The materials of the scanning lines 11 and the data lines 12 can also be transparent materials with low resistivity such as carbon nanotubes or graphene, so as to reduce an influence of the scanning lines 11 and the data lines 12 on pixel opening rate.

A number of the scanning lines 11 and the data lines 12 can be set according to a size of the array substrate 100 and a resolution specification of the array substrate 100, which is not specifically limited in the present application.

The first sub-pixel electrode 21 and the second sub-pixel electrode 22 are electrically connected to the same one of the data lines 12, that is, the DLS driving mode can also be adopted to reduce a number of the data lines 12, thereby reducing a number of source driving chips and reducing production cost.

Since the scanning lines 11 are opened line by line, in each of the pixel units 20, a sub-pixel electrode electrically connected to a first opened one of the scanning lines 11 is the first sub-pixel electrode 21. The sub-pixel electrode electrically connected to a later-opened one of the scanning lines 11 is the second sub-pixel electrode 22.

In the embodiments of the present application, in each row of the pixel units 20, the first sub-pixel electrode 21 and the second sub-pixel electrode 22 are arranged alternately. Moreover, each first sub-pixel electrode 21 is electrically connected with the adjacent one of the scanning lines 11 at an upper level of a row where the pixel unit 20 is located, and each second sub-pixel electrode 22 is electrically connected with the adjacent one of the scanning lines 11 at a lower level of a row where the pixel unit is located, so that the connection mode between the first sub-pixel electrodes 21 and the second sub-pixel electrodes 22 in each row of the pixel units 20 and the scanning lines 11 and the data lines 12 is singular. Thus, the connection types of the first sub-pixel electrodes 21 and the second sub-pixel electrodes 22 can be reduced, an interference difference between each sub-pixel can be reduced, the brightness difference between each sub-pixel can be reduced, and the problem of the head shaking stripes can be improved.

It should be noted that in the embodiments of the present application, the pixel connection types of the pixel units 20 located in at least odd rows are same, and the pixel connection types of the pixel units 20 located in even rows are same. Therefore, only the first row of the pixel units 20 and the second row of the pixel units 20 are shown as examples.

Referring to FIG. 6, in the embodiments of the present application, the first sub-pixel electrodes 21 located in two adjacent rows of the pixel units 20 are staggered along the first direction Y. In a same column of the pixel units 20, adjacent two of the pixel units 20 are respectively connected to adjacent two of the data lines 12.

Specifically, each of the pixel unit 20 in one row of the pixel units 20 is electrically connected to one of the data lines 12 adjacent to a left side. Each of the pixel units 20 in the other row of the pixel units 20 is electrically connected to one of the data lines 12 adjacent to a right side.

In the embodiments of the present application, the first sub-pixel electrodes 21 located in two adjacent rows of the pixel units 20 are staggered, and in a same column, the adjacent pixel units 20 are connected to different data lines 12. While reducing the pixel connection type of the first sub-pixel electrode 21 and the second sub-pixel electrode 22 in the array substrate 100, the polarities of the first sub-pixel electrode 21 and the second sub-pixel electrode 22 can be controlled by changing the polarities of the data voltages transmitted by the adjacent data lines 12. Thus, more voltage reversal functions can be realized in the first direction Y.

Further, in a same pixel unit 20, the first sub-pixel electrode 21 is closer to the data line 12 connecting the first sub-pixel electrode 21 and the second sub-pixel electrode 22 at a same time.

Specifically, in the pixel unit 20 electrically connected to one of the data lines 12 adjacent to the left side, the first sub-pixel electrode 21 is located in a first column and the second sub-pixel electrode 22 is located in a second column. In the pixel unit 20 electrically connected to one of the data lines 12 adjacent to the right side, the first sub-pixel electrode 21 is located in the second column and the second sub-pixel electrode 22 is located in the first column.

It can be understood that in the array substrate 100 of the embodiments of the present application, the pixel connection type of the first sub-pixel electrode 21 is C-type, that is, it is connected from the upper short axis. The pixel connection type of the second sub-pixel electrode 22 is B-type, that is, it is connected from the lower long axis.

It can be seen that the array substrate 100 provided by the embodiments of the present application comprises only two pixel connection types. From the above analysis, it can be seen that the gate source capacitance Cgs of C-type is small, and the coupling capacitance Cpg of B-type is small. Therefore, the pixel connection types in the embodiments of the present application has less influence on the first sub-pixel electrode 21 and the second sub-pixel electrode 22, so as to further reduce the brightness difference between each sub-pixel and improve the problem of head shaking stripes.

Further, in a same frame display screen, two adjacent data lines 12 are configured to transmit data voltages with opposite polarities.

Therefore, in the embodiments of the present application, the array substrate 100 adopts a 2-point inversion driving mode along the second direction X, and the 2-point inversion driving mode is also adopted along the first direction Y, which can further improve the quality of the display screen.

It should be noted that the following embodiments of the present application take an example that in each row of the pixel units 20, the sub-pixels corresponding to a plurality of the first sub-pixel electrodes 21 and a plurality of the second sub-pixel electrodes 22 are repeatedly arranged with RGB as a repeating unit, and the sub-pixel colors corresponding to the first sub-pixel electrode 21 or the second sub-pixel electrode 22 located in a same column are same, but it cannot be understood as a limitation of the present application.

In addition, please refer to FIG. 7, FIG. 7 is a schematic diagram of a brightness distribution of green sub-pixels of adjacent columns in FIG. 6 provided by the present application. According to the above analysis, in the embodiments of the present application, when two adjacent data lines 12 are configured to transmit data voltages with opposite polarities, in a first row of the pixel unit 20, a first green sub-pixel is a positive pixel and is B-type connected from the lower long axis, a second green sub-pixel is a positive pixel and is C-type connected from the upper short axis, a third green sub-pixel is a negative pixel and is B-type connected from the lower long axis, and a fourth green sub-pixel is a negative pixel and is C-type connected from the upper short axis. The pixel connection types of the green sub pixels in a second row of the pixel unit 20, a third row of the pixel unit 20, and a fourth row of the pixel unit 20 (not shown in the figure) can be obtained according to the above content, and will not be repeated here.

Wherein, in the first row of the pixel units 20, for the first green sub-pixel, the gate source capacitance Cgs is large and the coupling capacitance Cpg is ignored. For the second green sub-pixel, the gate source capacitance Cgs is small and the coupling capacitance Cpg is large. Therefore, considering the influence of the gate source capacitance Cgs and the coupling capacitance Cpg on the brightness of sub-pixel, the feedthrough voltage Vft of B-type and C-type can be regarded as same. And the first green sub-pixel and the second green sub-pixel are positive pixels. Therefore, the brightness of the first green sub-pixel and the brightness of the second green sub-pixel are considered to be same. Similarly, the brightness of the third green sub-pixel and the brightness of the fourth green sub-pixel are considered to be same. Because the brightness of the negative pixel is greater than that of the positive pixel under the same feedthrough voltage Vft, the brightness of the first green sub-pixel and the second green sub-pixel is set to 2, and the brightness of the third green sub-pixel and the fourth green sub-pixel is set to 3. A brightness distribution of the second row of the pixel unit 20, the third row pixel unit 20, and the fourth row pixel unit 20 can be obtained according to the above analysis, and will not be repeated here.

It can be seen that in the brightness distribution of the array substrate 100 of the embodiments of the present application, a total brightness of the green sub-pixels of the adjacent columns is 10. If there is no column brightness difference, the striped shaking head phenomenon will not be formed.

Of course, in other embodiments of the present application, in a same frame display screen, each of the data lines 12 can be configured to transmit data voltages with a same polarity. In two adjacent frames of display screens, each of the data lines 12 is configured to transmit data voltages of opposite polarities.

Thus, the array substrate 100 adopts a driving mode of frame inversion to improve a quality of the display picture, reduce the change complexity of the data voltages and reduce the power consumption of the driving chip providing the data voltages. At this time, if there is no difference in positive and negative polarities in a same frame, since the pixel connection types of the first sub-pixel electrode 21 and the second sub-pixel electrode 22 are fixed, total brightness of the green sub-pixels in the adjacent columns is also same, and the problem of the head shaking stripes will not occur.

Figures 8, 9:
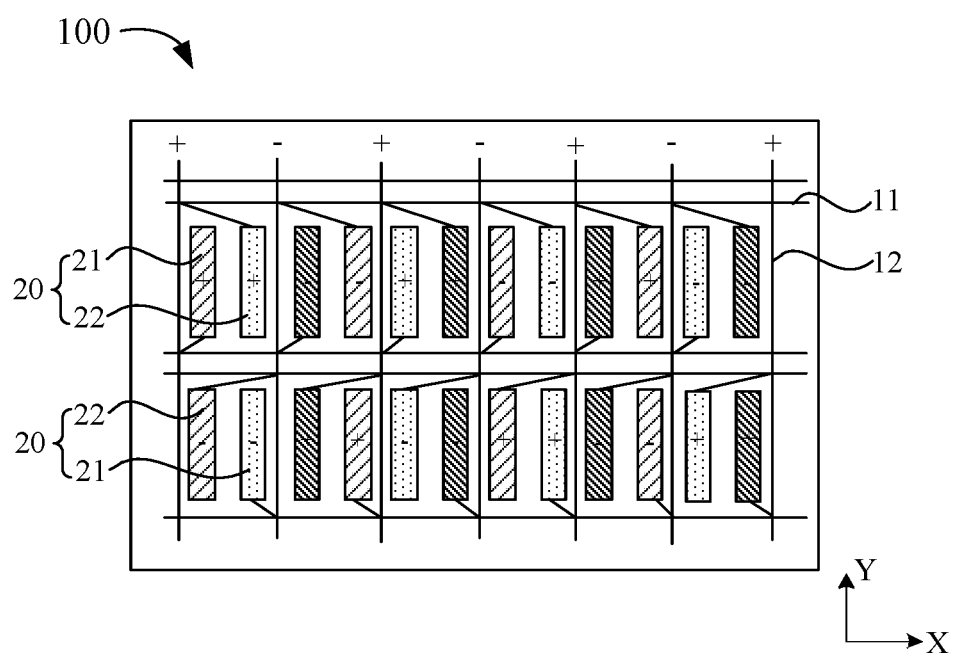
FIG. 8 is a second structural schematic diagram of an array substrate provided by the present application.
FIG. 9 is a schematic diagram of a brightness distribution of green sub-pixels of adjacent columns in FIG. 8 provided by the present application.

Please refer to FIG. 8, FIG. 8 is a second structural diagram of an array substrate provided by the present application. A difference from the array substrate 100 shown in FIG. 6 is that in the embodiments of the present application, in a same pixel unit 20, the second sub-pixel electrode 22 is closer to one of the data lines 12 connecting the first sub-pixel electrode 21 and the second sub-pixel electrode 22 at a same time.

Specifically, in the pixel unit 20 electrically connected to one of the data lines 12 adjacent to the left side, the first sub-pixel electrode 21 is located in the second column and the second sub-pixel electrode 22 is located in the first column. In the pixel unit 20 electrically connected to one of the data lines 12 adjacent to the right side, the first sub-pixel electrode 21 is located in the first column and the second sub-pixel electrode 22 is located in the second column.

In the array substrate 100 of the embodiments of the present application, the pixel connection type of the first sub-pixel electrode 21 is D-type, that is, connected from the upper long axis. The pixel connection type of the second sub-pixel electrode 22 is A-type, that is, connected from the lower minor axis.

It can be seen that the array substrate 100 provided by the embodiments of the present application only comprises two pixel connection types, which can reduce the brightness difference between each sub-pixel and improve the problem of the head shaking stripes.

Further, the two adjacent data lines 12 can also be configured to transmit data voltages of opposite polarities. At this time, in the first row of the pixel units 20, the first green sub-pixel is a positive pixel and is D-type connected from the upper long axis, the second green sub-pixel is a positive pixel and is A-type connected from the lower short axis, the third green sub-pixel is a negative pixel and is D-type connected from the upper long axis, and the fourth green sub-pixel is a negative pixel and is A-type connected from the lower short axis. The pixel connection types of the green sub pixels in the second row of the pixel units 20, the third row of the pixel units 20, and the fourth row of the pixel units 20 can be obtained according to the above content, and will not be repeated here.

Please refer to FIG. 9, FIG. 9 is a schematic diagram of a brightness distribution of green sub-pixels of adjacent columns in FIG. 8 provided by the present application. As can be seen from the figure, in the brightness distribution of the array substrate 100 according to the embodiments of the present application, the total brightness of the green sub-pixels in the adjacent columns is 10. There is no column brightness difference, the striped shaking head phenomenon will not be formed.

Figure 10:
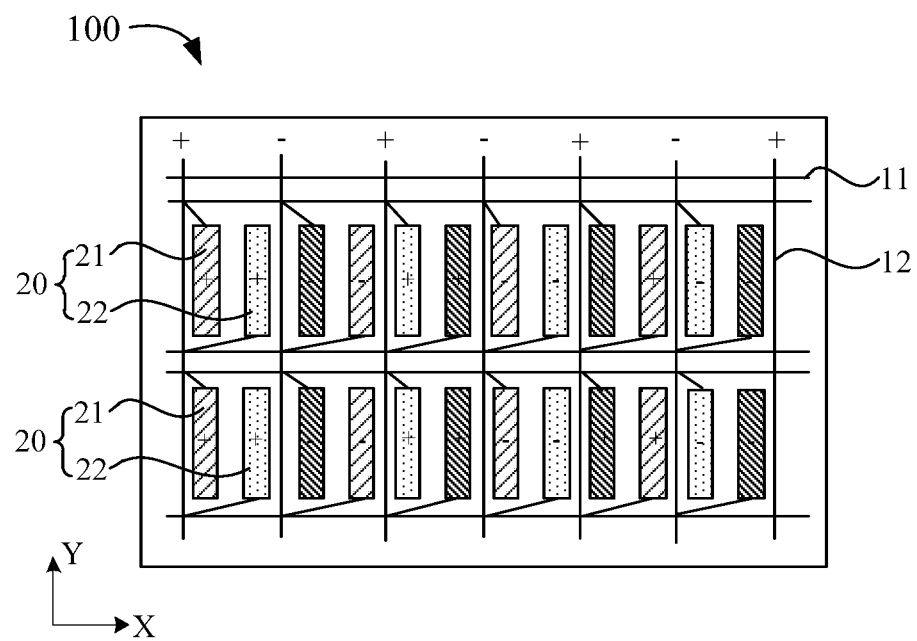
FIG. 10 is a third structural schematic diagram of an array substrate provided by the present application.

Please refer to FIG. 10, FIG. 10 is a third structural diagram of an array substrate provided by the present application. A difference from the array substrate 100 shown in FIG. 6 is that in this embodiment, the first sub-pixel electrodes 21 located in two adjacent rows of the pixel units 20 are arranged in a one-to-one correspondence, and the pixel units 20 located in a same column are electrically connected with a same one of the data lines 12. In each of the pixel units 20, the first sub-pixel electrode 21 is located in the first column and the second sub-pixel electrode 22 is located in the second column.

In the embodiments of the present application, the pixel connection type of the first sub-pixel electrode 21 is C-type, that is, it is connected from the upper short axis. The pixel connection type of the second sub-pixel electrode 22 is B-type, that is, it is connected from the lower long axis. The pixel connection type of the first sub-pixel electrode 21 and the second sub-pixel electrode 22 is fixed, which reduces the pixel connection type in the array substrate 100 and reduces the interference difference between each sub-pixel.

In addition, since positions of the first sub-pixel electrode 21 and the second sub-pixel electrode 22 are same in each row of the pixel unit 20, connections of the first sub-pixel electrode 21 and the second sub-pixel electrode 22 with the scanning lines 11 and the data lines 12 are more regular, which simplifies a manufacturing process.

Further, when two adjacent data lines 12 can also be configured to transmit data voltages with opposite polarities, the 2-point inversion driving mode is adopted along the second direction X, and the polarities of the data voltages accessed by each of the pixel unit 20 are same along the first direction Y.

Of course, in other embodiments, the polarities of the data voltages transmitted by each of the data line 12 when each row of the scanning lines 11 is opened can also be changed so that the polarities of the data voltages received by two adjacent of the pixel units 20 sharing the same one of the data lines 12 along the first direction Y is opposite. While simplifying the manufacturing process, through the change of data voltage polarity, 2-point inversion is realized to further improve the display screen.

Figure 11:
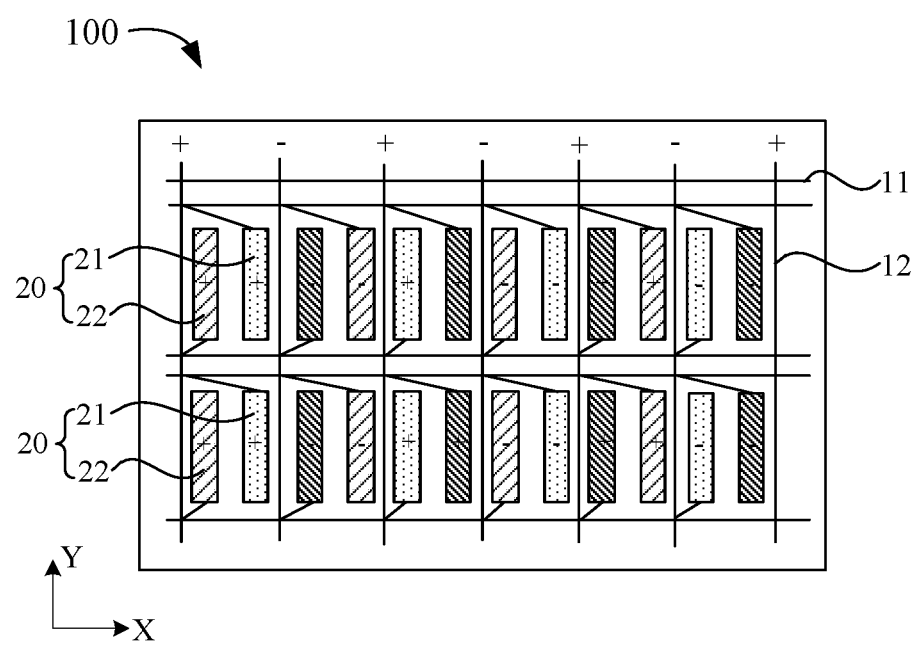
FIG. 11 is a fourth structural schematic diagram of an array substrate provided by the present application.

Please refer to FIG. 11, FIG. 11 is a fourth structural diagram of an array substrate provided by the present application. A difference from the array substrate 100 shown in FIG. 10 is that in this embodiment, in each of the pixel unit 20, the first sub-pixel electrode 21 is located in the second column and the second sub-pixel electrode 22 is located in the first column.

In the embodiments of the present application, the pixel connection type of the first sub-pixel electrode 21 is A-type, that is, it is connected from the upper long axis. The pixel connection type of the second sub-pixel electrode 22 is D-type, that is, it is connected from the lower short axis. The pixel connection types of the first sub-pixel electrode 21 and the second sub-pixel electrode 22 are fixed, which reduces the pixel connection type in the array substrate 100 and reduces the interference difference between each sub-pixel.

Similarly, since positions of the first sub-pixel electrode 21 and the second sub-pixel electrode 22 are same in each row of the pixel unit 20, connections of the first sub-pixel electrode 21 and the second sub-pixel electrode 22 with the scanning lines 11 and the data lines 12 are more regular, which simplifies the manufacturing process.

Figure 12:
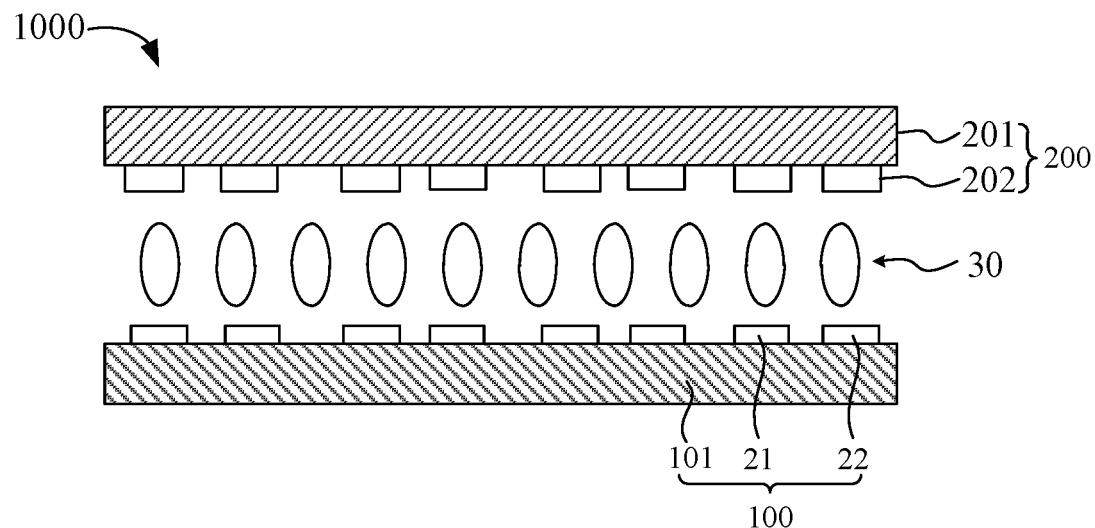
FIG. 12 is a structural schematic diagram of a liquid crystal display panel provided by the present application.

Accordingly, the present application also provides a liquid crystal display panel. Specifically, please refer to FIG. 12, FIG. 12 is a structural diagram of a liquid crystal display panel provided by the present application.

The liquid crystal display panel 1000 comprises an array substrate 100 and a color film substrate 200 arranged corresponding to each other. A liquid crystal layer 30 is arranged between the array substrate 100 and the color film substrate 200. The array substrate 100 comprises a functional film layer 101 and first sub-pixel electrodes 21 and second sub-pixel electrodes 22 arranged on the functional film layer 101. The color film substrate 200 comprises a substrate 201 and color resists 202 disposed on the substrate 201. Each of the color resists 202 is arranged corresponding to one of the first sub-pixel electrodes 21 or one of the second sub-pixel electrodes 22.

In the liquid crystal display panel 1000, the sub pixels presented in the display screen can be red sub pixels, green sub pixels, blue sub pixels, white sub pixels, yellow sub pixels, etc., which are not specifically limited in the present application. The liquid crystal display panel 1000 provided by the application can adopt standard RGB pixel arrangement architecture, RGB PENTILE pixel arrangement architecture, RGB delta pixel arrangement architecture, RGBW pixel arrangement architecture, etc., which can be set according to the display requirements of the liquid crystal display panel 1000.

In this regard, in some embodiments of the present application, the plurality of the color resists 202 can comprise red color resists, green color resists, blue color resists, etc., to form red sub pixels, green sub pixels, and blue sub pixels.

In the embodiments of the present application, the red color resist, the green color resist, and the blue color resist arranged corresponding to a row of the pixel units 20 are repeatedly arranged in any arrangement combination. Color of the color resist 202 corresponding to the first sub-pixel electrode 21 or the second sub-pixel electrode 22 located in a same column is same.

The RGB pixel arrangement structure is simple, and the manufacturing process is mature. The application in this present application can simplify the process and reduce the production cost.

Accordingly, the present application further provides a display device, which comprises an array substrate, a source driving chip, and a gate driving circuit. The source driver chip is configured to provide data voltages to the array substrate. The gate driving circuit is configured to provide scanning signals to the array substrate. The array substrate is the array substrate described in any of the above embodiments. For details, please refer to the above contents and will not be repeated here.

In addition, the display device can be a smartphone, tablet computer, e-book reader, smartwatch, camera, game console, etc., which is not limited in this application.

Figure 13:
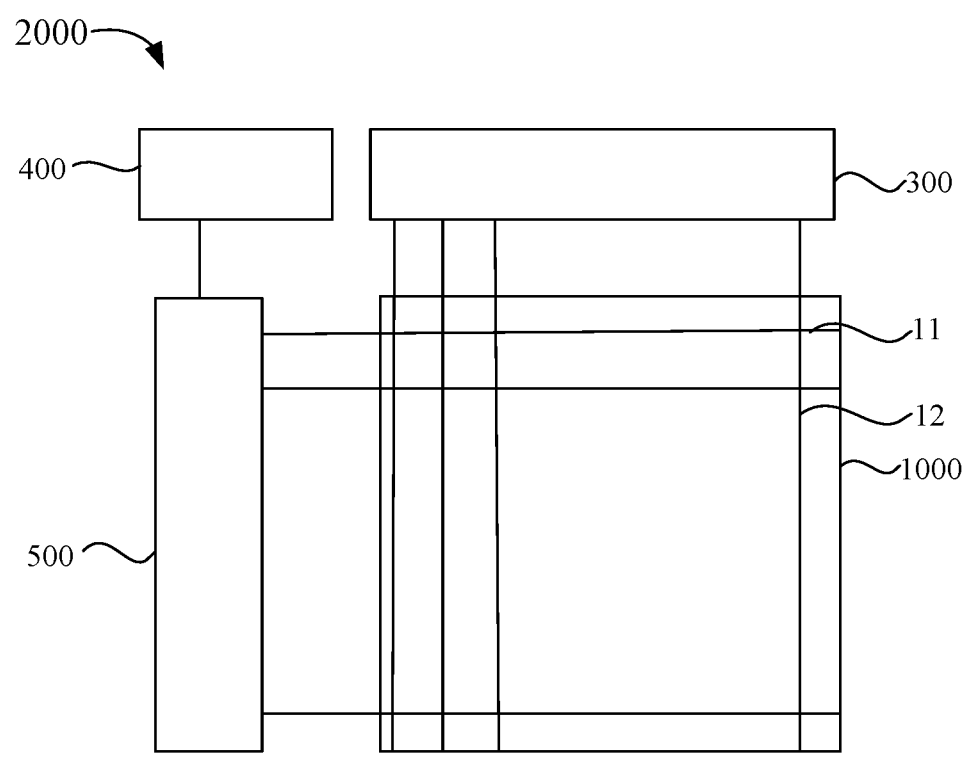
FIG. 13 is a structural schematic diagram of a display device provided by the present application.

Specifically, please refer to FIG. 13, FIG. 13 is a structural diagram of a display device provided by the present application. Wherein, the display device 2000 comprises a liquid crystal display panel 1000, a gate driving circuit 500, a source driving chip 300, and a timing controller 400.

The liquid crystal display panel 1000 comprises an array substrate. The array substrate comprises a plurality of scanning lines 11 and a plurality of data lines 12. The plurality of scan lines 11 are arranged in the first direction Y. The plurality of data lines 12 are arranged along the second direction X. The liquid crystal display panel 1000 comprises a plurality of sub-pixels (not shown in the figure), and each of the sub-pixels is electrically connected with a corresponding one of the scanning lines 11 and a corresponding one of the data lines 12.

The timing controller 400 can generate a scanning control signal for controlling the gate drive circuit 500 and a data control signal for controlling the source drive chip 300 in response to an externally received control signals. For example, the control signals can comprise a point clock, a data enable signal, a vertical synchronization signal, and a horizontal synchronization signal. The timing controller 400 can supply the scan control signal to the gate drive circuit 500 and can supply the data control signal to the source drive chip 300.

The gate driving circuit 500 transmits scanning signals to the liquid crystal display panel 1000 through the scanning line 11. In some embodiments, the gate drive circuit 500 can be an independently arranged gate chip. In other embodiments, the gate driving circuit 500 can be a GOA (array substrate gate driving technology) arranged in the array substrate, which is not specifically limited in the present application.

The source driving chip 300 transmits data signals to the liquid crystal display panel 1000 through the data line 12. In some embodiments, the source drive chip 300 can be bound to the array substrate through COF (chip on film), which is not specifically limited in the present application.

The present application provides a display device 2000. The display device 2000 comprises the liquid crystal display panel 1000. In each row of the pixel units of the liquid crystal display panel 1000, the first sub-pixel electrodes and the second sub-pixel electrodes are arranged alternately, and the first sub-pixel electrodes are staggered or arranged in a one-to-one correspondence in two adjacent rows of the pixel units. Moreover, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located, so that connections of the first sub-pixel electrode and the second sub-pixel electrode with the scanning lines and the data lines are more regular. Thus, the connection type of the first sub-pixel electrodes and the second sub-pixel electrodes can be reduced, the interference difference between each sub-pixel can be reduced, the brightness difference between each sub-pixel can be reduced, and the problem of the head shaking stripes can be improved.

The array substrate, the liquid crystal display panel, and the display device provided by the embodiments of the present invention are introduced in detail. In this paper, specific examples are applied to elaborate the principle and embodiment of the invention. The description of the above embodiment is only used to help understand the technical scheme and core idea of the invention. Those of ordinary skill in the art should understand that they can still modify the technical scheme recorded in the above embodiments, or equivalent replace some of the technical features. These modifications or substitutions do not separate the essence of the corresponding technical scheme from the scope of the technical scheme of each embodiment of the present invention.

What is claimed is:

1. An array substrate comprising:
   a plurality of scanning lines, the plurality of the scanning lines arranged along a first direction;
   a plurality of data lines, the plurality of the data lines arranged along a second direction, and the second direction and the first direction intersect;
   a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;
   wherein, one of the data lines is arranged between two adjacent columns of the pixel units, and two of the scanning lines are arranged between two adjacent rows of the pixel units; in each row of the pixel units, first sub-pixel electrode electrodes and second sub-pixel electrode electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located,
   wherein, along the first direction, the first sub-pixel electrodes located in the two adjacent rows of the pixel units are staggered, and in a same column of the pixel units, adjacent two of the pixel units are respectively connected to adjacent two of the data lines, and
   wherein in a same frame display screen, each of the data lines is configured to transmit a data voltage with a same polarity, and in two adjacent frame display screens, a same one of the data lines is configured to transmit data voltages with opposite polarity.

2. The array substrate according to claim 1, wherein in a same one of the pixel units, the first sub-pixel electrode is closer to a corresponding one of the data lines connecting the first sub-pixel electrode and the second sub-pixel electrode at a same time.

3. The array substrate according to claim 1, wherein in a same one of the pixel units, the second sub-pixel electrode is closer to a corresponding one of the data lines connecting the first sub-pixel electrode and the second sub-pixel electrode at a same time.

4. The array substrate according to claim 1, wherein, in a same frame display screen, adjacent two of the data lines are configured to transmit data voltages with opposite polarities.

5. A liquid crystal display panel, comprising an array substrate and a color film substrate arranged correspondingly to each other, wherein the array substrate comprises:
   a plurality of scanning lines, the plurality of the scanning lines arranged along a first direction;
   a plurality of data lines, the plurality of the data lines arranged along a second direction, and the second direction and the first direction intersect;
   a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;
   wherein, one of the data lines is arranged between two adjacent columns of the pixel units, and two of the scanning lines are arranged between two adjacent rows of the pixel units; in each row of the pixel units, first sub-pixel electrode electrodes and second sub-pixel electrode electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located,
   wherein, along the first direction, the first sub-pixel electrodes located in the two adjacent rows of the pixel units are staggered, and in a same column of the pixel units, adjacent two of the pixel units are respectively connected to adjacent two of the data lines, and
   wherein in a same frame display screen, each of the data lines is configured to transmit a data voltage with a same polarity, and in two adjacent frame display screens, a same one of the data lines is configured to transmit data voltages with opposite polarity.

6. The liquid crystal display panel according to claim 5, wherein the color film substrate comprises a plurality of color resists, and the plurality of the color resists comprise red color resists, green color resists, and blue color resists;
   wherein, each of the color resists is arranged to the first sub-pixel electrode or the second sub-pixel electrode, the red color resists, the green color resists, and the blue color resists arranged corresponding to one row of the pixel units are repeatedly arranged in any arrangement combination, and colors of the color resists corresponding to the first sub-pixel electrode or the second sub-pixel electrode in a same column are same.

7. The liquid crystal display panel according to claim 5, wherein in a same one of the pixel units, the first sub-pixel electrode is closer to a corresponding one of the data lines connecting the first sub-pixel electrode and the second sub-pixel electrode at a same time.

8. The liquid crystal display panel according to claim 5, wherein in a same one of the pixel units, the second sub-pixel electrode is closer to a corresponding one of the data lines connecting the first sub-pixel electrode and the second sub-pixel electrode at a same time.

9. A display device, wherein the display device comprises a liquid crystal display panel, a source driving chip, and a gate driving circuit, the source driving chip is configured to provide data voltages to the liquid crystal display panel, the gate driving circuit is configured to provide scanning signals to the liquid crystal display panel, the liquid crystal display panel comprises an array substrate, and the array substrate comprises:
   a plurality of scanning lines, the plurality of the scanning lines arranged along a first direction;
   a plurality of data lines, the plurality of the data lines arranged along a second direction, and the second direction and the first direction intersect;
   a plurality of pixel units, the plurality of the pixel units arranged in an array, wherein each of the pixel units comprises a first sub-pixel electrode and a second sub-pixel electrode, and the first sub-pixel electrode and the second sub-pixel electrode are connected to a same one of the data lines;
   wherein, one of the data lines is arranged between two adjacent columns of the pixel units, and two of the scanning lines are arranged between two adjacent rows of the pixel units; in each row of the pixel units, first sub-pixel electrode electrodes and second sub-pixel electrode electrodes are arranged alternately, each of the first sub-pixel electrodes is electrically connected with an adjacent one of the scanning lines at an upper level of a row where the pixel unit is located, and each of the second sub-pixel electrodes is electrically connected with an adjacent one of the scanning lines at a lower level of a row where the pixel unit is located, wherein, along the first direction, the first sub-pixel electrodes located in the two adjacent rows of the pixel units are staggered, and in a same column of the pixel units, adjacent two of the pixel units are respectively connected to adjacent two of the data lines, and wherein in a same frame display screen, each of the data lines is configured to transmit a data voltage with a same polarity, and in two adjacent frame display screens, a same one of the data lines is configured to transmit data voltages with opposite polarity.

10. The display device according to claim 9, wherein the liquid crystal display panel comprises an array substrate and a color film substrate arranged corresponding to each other;

wherein, the color film substrate comprises a plurality of color resists, and the plurality of color resists comprises red color resists, green color resists, and blue color resists;

wherein, each of the color resists is arranged corresponding to the first sub-pixel electrode or the second sub-pixel electrode, the red color resists, the green color resists, and the blue color resists arranged corresponding to one row of the pixel units are repeatedly arranged in any arrangement combination, and colors of the color resists corresponding to the first sub-pixel electrode or the second sub-pixel electrode in a same column are same.

11. The display device according to claim 9, wherein in a same one of the pixel units, the first sub-pixel electrode is closer to a corresponding one of the data lines connecting the first sub-pixel electrode and the second sub-pixel electrode at a same time.

12. The display device according to claim 9, wherein in a same one of the pixel units, the second sub-pixel electrode is closer to a corresponding one of the data lines connecting the first sub-pixel electrode and the second sub-pixel electrode at a same time.

\* \* \* \* \*